United States Patent [19]

Utykanski et al.

[11] Patent Number: 5,219,441
[45] Date of Patent: Jun. 15, 1993

[54] WHEEL ASSEMBLY HAVING A WHEEL DISC SKIRT WITH A CONICAL SURFACE

[75] Inventors: Victor A. Utykanski, Warren; Gary M. Champine, Sterling Hgt's; Donald A. Raitzer, Farmington Hills, all of Mich.

[73] Assignee: The Budd Company, Troy, Mich.

[21] Appl. No.: 870,355

[22] Filed: Apr. 17, 1992

[51] Int. Cl.$^5$ .............................................. B60B 23/00
[52] U.S. Cl. ...................................... 301/63.1; 301/95
[58] Field of Search ................. 301/62, 95, 5.1, 63.1

[56] References Cited

U.S. PATENT DOCUMENTS

| | | | |
|---|---|---|---|
| 1,977,567 | 10/1934 | Ersergian | 301/63 R |
| 3,210,126 | 7/1963 | Travers | 301/63 R |
| 3,235,312 | 2/1966 | Hollander | 301/63 R |
| 3,874,736 | 4/1975 | Anderson et al. | 301/63 R |
| 4,241,597 | 12/1980 | Golata et al. | 72/327 |
| 4,573,338 | 3/1986 | Daudi | 72/333 |

FOREIGN PATENT DOCUMENTS

| | | | |
|---|---|---|---|
| 1918022 | 10/1970 | Fed. Rep. of Germany | 301/63 R |
| 784131 | 7/1935 | France | 301/63 R |
| 812009 | 4/1937 | France | 301/63 R |
| 573796 | 3/1958 | Italy | 301/63 R |
| 357747 | 10/1931 | United Kingdom | 301/63 R |

*Primary Examiner*—Russell D. Stormer
*Attorney, Agent, or Firm*—Harness, Dickey & Pierce

[57] ABSTRACT

A motor vehicle wheel having an annular wheel rim and a wheel disc in which the flange of the wheel disc is formed with a frustoconical outer surface for engagement with and attachment to a frustoconical inner surface of the wheel rim enabling the disc to be attached to the wheel rim at an inclined, larger diameter section of the wheel rim than the drop center well or the inflation ledge of the rim. This increases the size of the internal envelope formed by the wheel assembly thus increasing clearance for vehicle components within the wheel envelope, such as the brake assembly. Alternatively, a larger brake assembly may be utilized.

2 Claims, 3 Drawing Sheets

WHEEL ASSEMBLY HAVING A WHEEL DISC SKIRT WITH A CONICAL SURFACE

BACKGROUND AND SUMMARY OF THE INVENTION

The present invention relates to a motor vehicle wheel and in particular, to a wheel fabricated in a manner in which the wheel disc skirt has a conical surface for engagement with and attachment to a conical surface of the wheel rim.

Wheels for vehicles such as passenger cars, light, medium and heavy duty trucks or trailers are often fabricated from what is generally referred to as a wheel rim and a center wheel disc. In a typical tubeless wheel construction the rim, when viewed in cross-section, has a rim flange and bead seat at each end and a drop center well and an inflation ledge between the two bead seats. The wheel disc is configured to have a skirt that is parallel to the center line of the wheel rim, thus forming a cylinder. The cylindrical disc skirt is typically attached to a cylindrical portion of the wheel rim, usually the inflation ledge of the rim or the drop center well.

Recent changes in vehicle design namely reduction in wheel diameter to reduce the loading height of truck trailers, and/or the increased size of brake components to improve braking performance have resulted in a decrease in clearance between the brake components and the wheel. This decrease in clearance between the brake components and the wheel causes heat dissipated from the brake drum to conduct through the wheel rim to the tire bead seats resulting in possible tire degradation.

Accordingly, it is an object of the present invention to configure a wheel disc and rim to increase the clearance between the wheel and the brake components without increasing the diameter of the wheel.

It is a feature of the present invention to form the wheel disc having a skirt with a conical outer surface for engagement with and attachment to the conical inner surface of the wheel rim bead seat. This enables the skirt to be attached to the bead seat of a rim rather than being attached to the inflation ledge or the drop center well. With the disc attached to the bead seat it is possible to reverse the orientation of the drop center well and inflation ledge, thereby increasing the clearance between the wheel and the brake drum.

Further objects, features and advantages of the invention will become apparent from a consideration of the following description and the appended claims when taken in connection with the accompanying drawings.

DETAILED DESCRIPTION OF THE INVENTION

Figure 1:
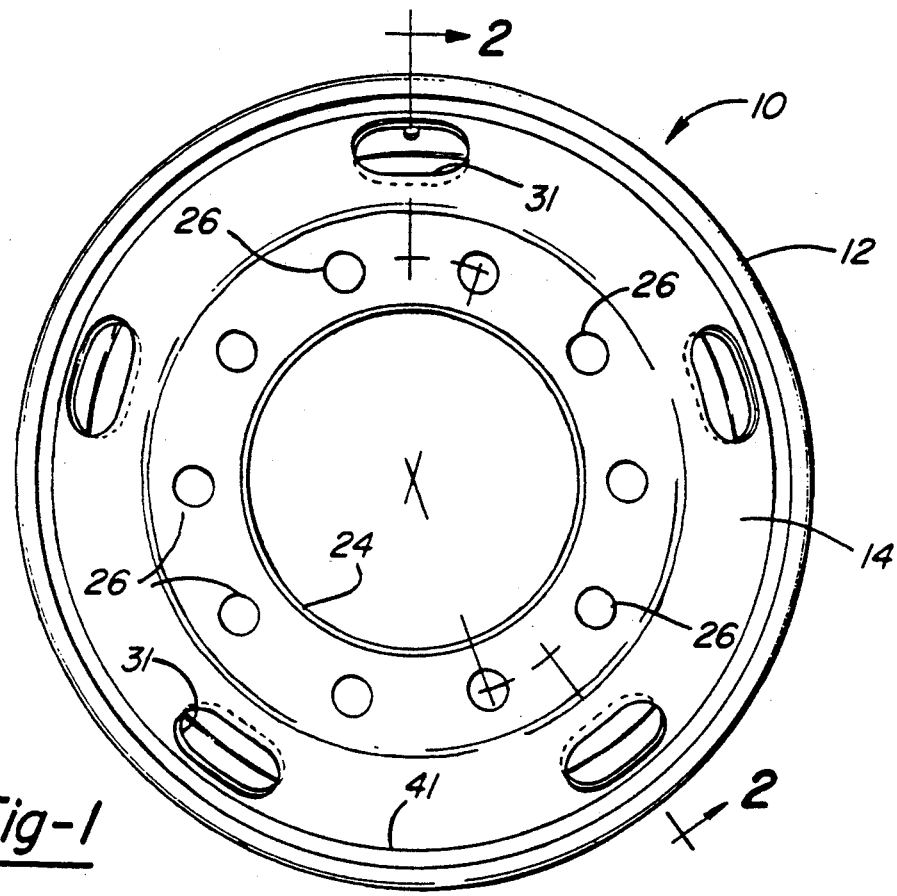
FIG. 1 is an elevation view of the wheel of the present invention.

The wheel of the present invention, including a conical disc skirt for engagement with and attachment to a conical section of the wheel rim is shown in FIG. 1 and designated generally at 10. Wheel 10 includes an annular wheel rim 12 and a separately manufactured wheel disc 14. The annular wheel rim 12 defines a center line, or an axis of rotation 16 for the wheel.

The wheel disc 14 has axially outer and inner surfaces 18 and 20 respectively. The disc 14 includes a wheel mounting face portion 22 that is generally normal to the axis 16. The wheel mounting face 22 includes a central opening 24 that provides clearance for the axle hub. A plurality of bolt holes 26 surround the central opening 24. Extending radially outwardly from the wheel mounting face 22 is an intermediate connecting portion 28 leading to an annular disc skirt 30. Additional openings 31 may be formed in the intermediate connecting portion to provide access for a valve stem (not shown), for ventilation, or for styling. The shape and number of openings 31 is variable.

The annular wheel rim 12 includes a drop center well 40 that is the smallest diameter portion of the wheel rim and is provided to facilitate tire mounting and removal. Extending axially in each direction from the drop center well 40 are a short side 36 comprised of an inclined bead seat 37 and rim flange 32 and a long side 38 comprised of the inflation ledge 39, inclined bead seat 41 and rim flange 34. The wheel rim is a typical wheel rim configuration and is shaped in accordance with standards for wheel rims. The terms long side and short side are only used to designate the bead seat closest to the drop center well. In other words, the bead seat 37 of the short side is adjacent to the drop center well while the bead seat 41 of the long leg is spaced from the drop center well by the inflation ledge 39.

Figure 3:
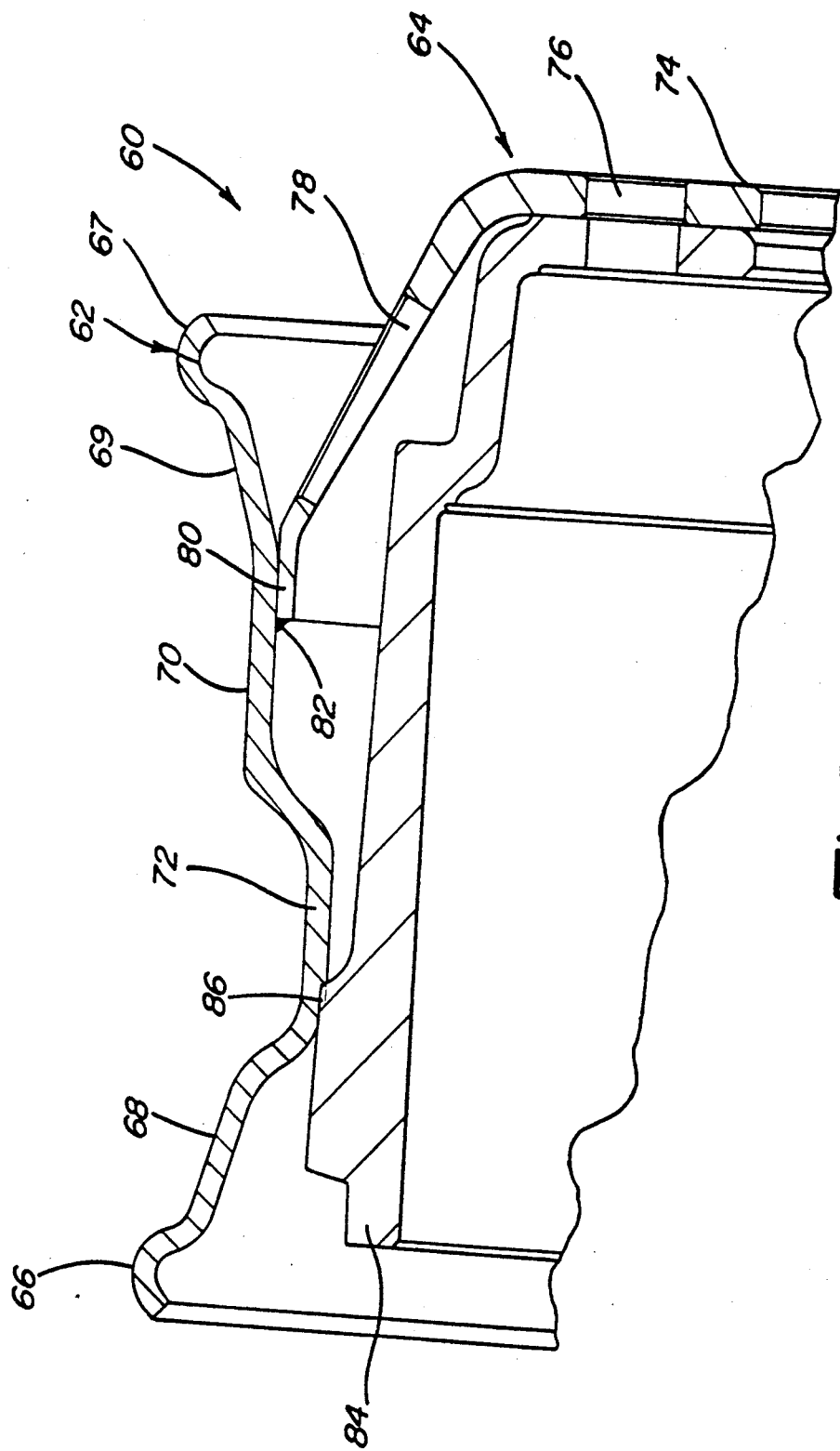
FIG. 3 is a sectional view of a typical prior art wheel and brake drum.
Figure 4:
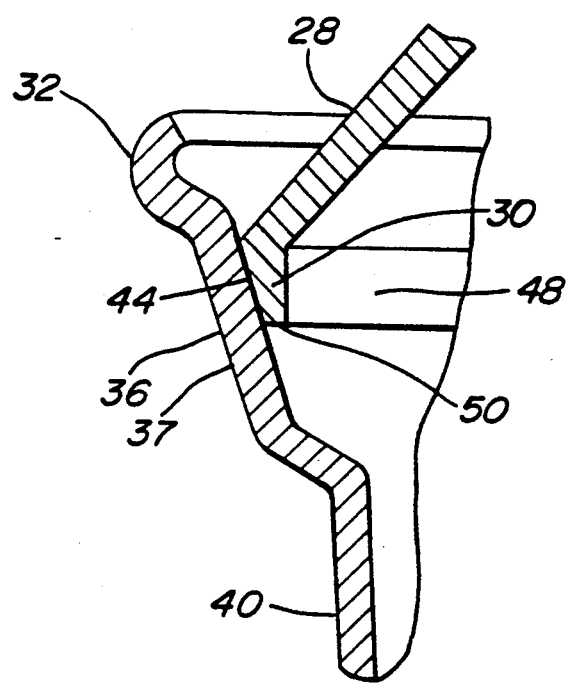
FIG. 4 is an enlarged view of the attachment of the wheel disc to the annular wheel rim contained in the circle 4 of FIG. 2.

The benefits of the invention can be best understood by first referring to a typical prior art wheel and brake shown in FIG. 3. The prior art wheel 60 includes a rim 62 and a wheel disc 64. The rim 62 has inboard and outboard rim flanges 66 and 67 respectively at each edge and inboard and outboard bead seats 68 and 69 respectively. The terms "inboard" and "outboard" are used to designate the position of the wheel 60 relative to the motor vehicle brake drum 84 as shown in FIG. 3. Between the two bead seats 68 and 69 are an inflation ledge 70 and a drop center well 72. As shown, the drop center well 72 is adjacent to the inboard bead seat 68 while the inflation ledge 70 is adjacent to the outboard bead seat 69.

The wheel disc 64 includes a mounting face 74 that is generally perpendicular to the rotational axis of the wheel and includes a plurality of stud (bolt) holes 76 for mounting the wheel to a vehicle. An inclined intermediate portion 78 couples the mounting face 74 with an axially extending skirt 80. The axially extending skirt forms a generally cylindrical outer surface for contact with and attachment to the cylindrical inner surface of the inflation ledge 70. A fillet weld 82 attaches the disc to the rim. With this configuration, the mounting face 74 of the disc is closest to the outboard bead seat while the drop center well is closer to the inboard bead seat.

When a truck wheel of the configuration of wheel 60 is reduced in diameter from a previous typical diameter of 22.5 or 24.5 inches to a 19.5 inch diameter, the clearance between the wheel and a brake drum 84 is significantly reduced. This reduction in clearance with respect to the brake drum can cause overheating of the tire, resulting in tire damage. In some instances, the drop center well may physically interfere with the brake drum as shown at 86.

Figure 2:
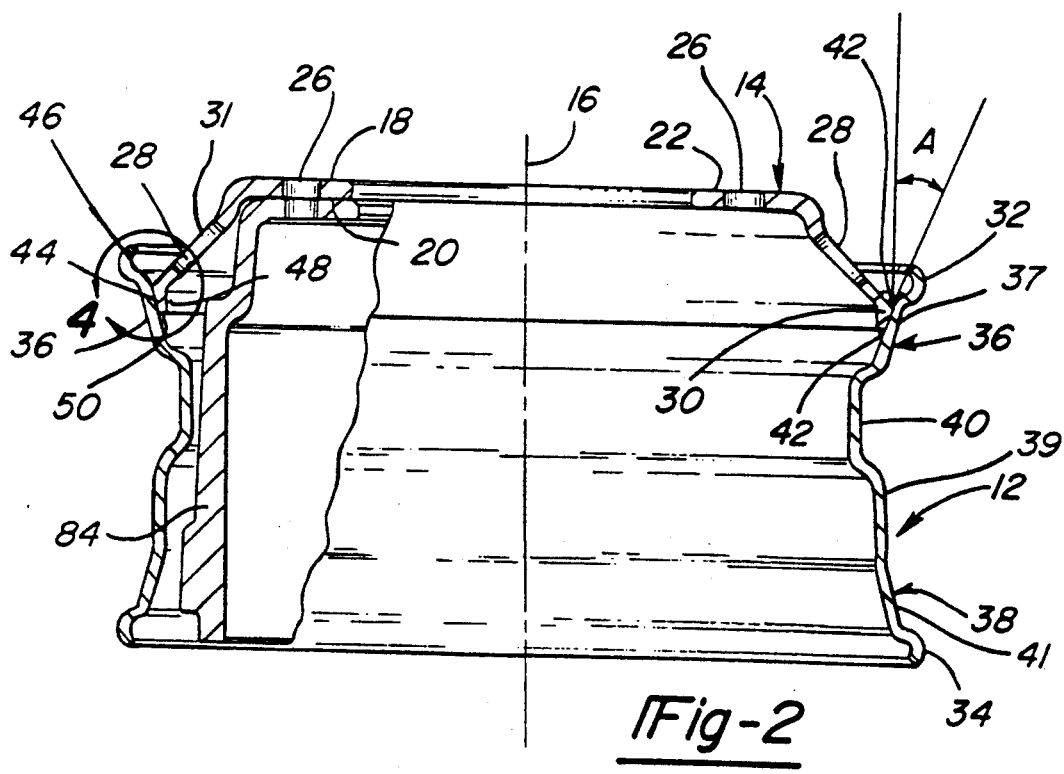
FIG. 2 is a sectional view as seen from substantially the line 2—2 of FIG. 1.

The wheel 10 of the present invention increases the clearance between the wheel and brake drum by reversing the profile of the rim in relation to the wheel disc such that the drop center well is adjacent to the same bead seat as the wheel disc. Because the wheel rim has been reversed, the wheel disc must be attached to the short side 36 of the rim. However, since the short side of the wheel rim does not include the inflation ledge, the disc 14 must be secured to the inner surface of the inclined bead seat 37. The added clearance between the wheel and brake drum is shown in FIG. 2 with the brake drum 84.

The outer surface 18 of the wheel disc at the skirt 30 is formed as a frustoconical outer surface 44 for engagement with and attachment to the wheel rim 12. The disc is fusion welded to the wheel rim along the skirt 30. The surface area of the frustoconical outer surface 44 of the skirt 30 can be made as large as necessary to provide the required strength to the fusion weld 42. The weld can be formed using various welding processes including laser welding.

The wheel disc 14 can be formed by various processes. The preferred process as described below is spin forming. The wall thickness of the disc can be tapered in the intermediate connecting portion 28 from the wheel mounting face 22 radially outward to the skirt 30. During the spinning process, the disc material can be accumulated at the initial radius 46 of the skirt 30 where the skirt is joined to the intermediate connecting portion 28. The wall thickness at the initial radius 46 will then be larger than the wall thickness of the intermediate connecting portion 28 adjacent to the skirt. The axially inner surface 48 of the skirt 30 can be formed substantially parallel to the axis 16 with only enough taper to remove the disc from a mandrel used in the spinning process. As a result of the frustoconical outer surface, the wall thickness of the skirt will decrease from the initial radius 46 to the peripheral edge 50 of the wheel disc. The angle A by which the skirt outer surface 44 and the bead seat are inclined to the axis 16 is set by wheel standards and currently ranges between 5°–15° depending on the wheel application.

It is to be understood that the invention is not limited to the exact construction illustrated and described above, but that various changes and modifications may be made without departing from the spirit and scope of the invention as defined in the following claims. For example, while a wheel rim with a drop center well has been shown, it is not essential to the invention that the rim have a drop center well. Additionally, while it provides additional clearance to mount the disc to the bead flange on the short side, adjacent to the drop center well, the disc can be attached to the long side bead flange as well without departing from the present invention.

We claim:

1. A motor vehicle wheel comprising:

an annular wheel rim having an axis and a drop center well, a first side portion extending radially outwardly and axially from said drop center wall in one direction and terminating in a first rim flange and a second side portion extending radially outwardly and axially from said drop center well in the opposite direction and terminating in a second rim flange, said first side portion having a radially inner surface inclined relative to said axis forming a frustoconical inner surface;

a disc for mounting said wheel to a motor vehicle having axially inner and outer surfaces, said disc including a wheel mounting face generally normal to the axis of said annular wheel rim having a central opening and a plurality of bolt holes spaced about said opening for mounting said disc to a vehicle, a radially outer skirt portion in which said axially outer surface is inclined to said axis forming a frustoconical surface for engagement with the frustoconical inner surface of said wheel rim and an intermediate connecting portion between said wheel mounting face and said skirt portion, said skirt portion having an initial radius immediately adjacent to said intermediate connecting portion at which the wall thickness of said skirt is greater than the wall thickness at the radially outer end of said intermediate connecting portion;

means for attaching said disc to said wheel rim at said frustoconical outer surface of said skirt portion and said frustoconical inner surface of said wheel rim.

2. The wheel of claim 1 wherein the axially inner surface of said disc skirt portion is substantially parallel to said axis whereby the wall thickness of said skirt tapers from said initial radius to a peripheral edge of said skirt.

* * * * *